United States Patent [19]
Evans et al.

[11] 3,772,654
[45] Nov. 13, 1973

[54] METHOD AND APPARATUS FOR DATA FORM MODIFICATION

[75] Inventors: James R. Evans, Endicott; Neil N. Krewson, Vestal; John W. Roossien, Binghamton, all of N.Y.

[73] Assignee: International Business Machines Corporation, Armonk, N.Y.

[22] Filed: Dec. 30, 1971

[21] Appl. No.: 214,358

[52] U.S. Cl. .................................. 340/172.5, 444/1
[51] Int. Cl. ............................................. G06f 5/00
[58] Field of Search ....................... 444/1; 340/172.5

[56] References Cited

UNITED STATES PATENTS

| | | | |
|---|---|---|---|
| 3,026,034 | 3/1962 | Couleur | 235/155 |
| 3,064,239 | 11/1962 | Svigals | 340/172.5 |
| 3,413,611 | 11/1968 | Pfuetze | 340/172.5 |
| 3,422,403 | 1/1969 | Webb | 340/172.5 |
| 3,432,811 | 3/1969 | Rinaldi et al. | 340/172.5 |
| 3,445,641 | 5/1969 | Rinaldi et al. | 235/176 |
| 3,490,690 | 1/1970 | Apple et al. | 340/172.5 X |
| 3,509,328 | 4/1970 | Arnstein | 340/172.5 X |
| 3,656,178 | 4/1972 | De Maine et al. | 444/1 |

OTHER PUBLICATIONS

Marron, B. A. et al., "Automatic Data Compression," Communications of the ACM, Vol. 10, Issue 11, Nov. 1967, pp. 711–715, L71401599

Deskevich, S., et al., "High Order Zero Suppression," I.B.M. Technical Disclosure Bulletin, Vol. 9, No. 6, Nov. 1966, pp. 609–610

*Primary Examiner*—Raulfe B. Zache
*Attorney*—George E. Clark et al.

[57] ABSTRACT

Apparatus and method for performing data form modification on information to be stored in a large scale storage system including, defining and storing data form modification routines to be performed;

defining and storing data elements which relate to a particular class of information to be stored;

executing the data form modification routines in and under the control of a processing unit which includes registers and counters associated with particular data form modification routines.

3 Claims, 14 Drawing Figures

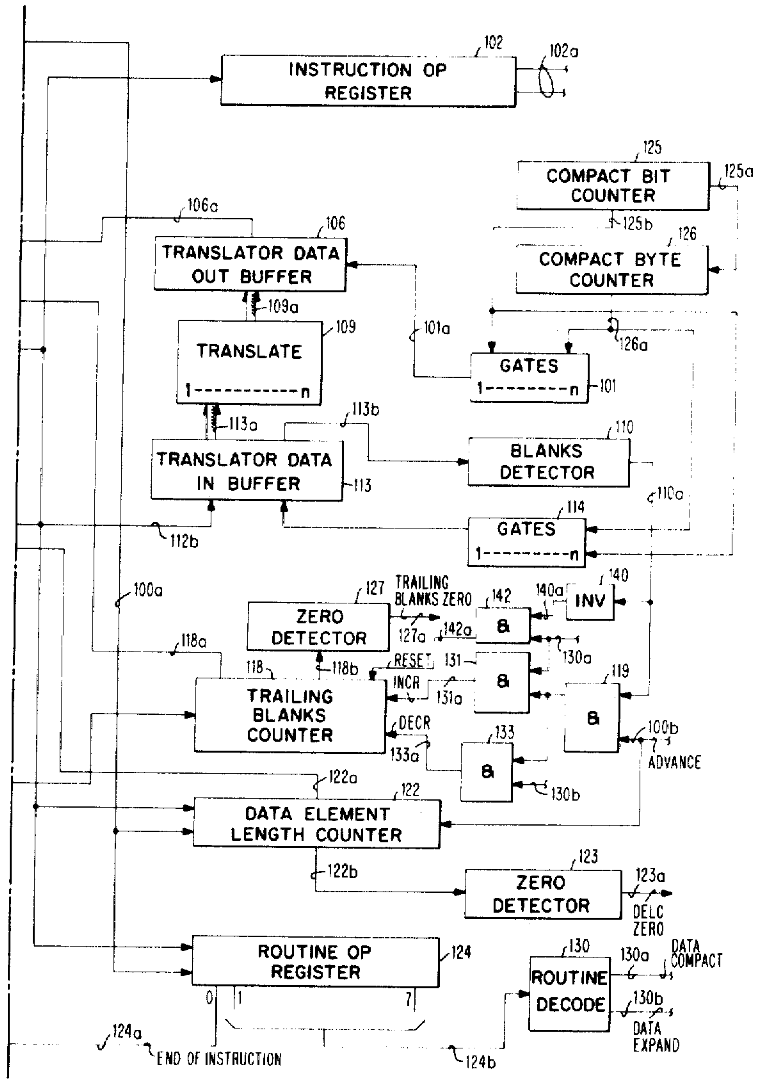
INSTRUCTION OP REGISTER
102
102a
COMPACT BIT COUNTER
125
125a
125b
COMPACT BYTE COUNTER
126
126a
TRANSLATOR DATA OUT BUFFER
106
106a
109a
TRANSLATE
1-----------n
109
101a
GATES
1--------n
101
113a
113b
TRANSLATOR DATA IN BUFFER
113
BLANKS DETECTOR
110
110a
GATES
1---------n
114
112b
100a
ZERO DETECTOR
127
TRAILING BLANKS ZERO
127a
142
142a
140a
INV
140
130a
118a
118
118b
RESET
INCR
131
131a
TRAILING BLANKS COUNTER
DECR
133a
133
119
100b
ADVANCE
130b
122a
122
DATA ELEMENT LENGTH COUNTER
122b
ZERO DETECTOR
123
123a
DELC ZERO
ROUTINE OP REGISTER
124
ROUTINE DECODE
130
130a
DATA COMPACT
130b
DATA EXPAND
124a
END OF INSTRUCTION
124b

FIG. 2A
| NO. | LENGTH BYTES |
|---|---|
| 3 | 25 |
| 2 | 12 |
| 6 | 6 |
| 4 | 6 |
| 1 | 7 |
0 78 31
FIG. 2B
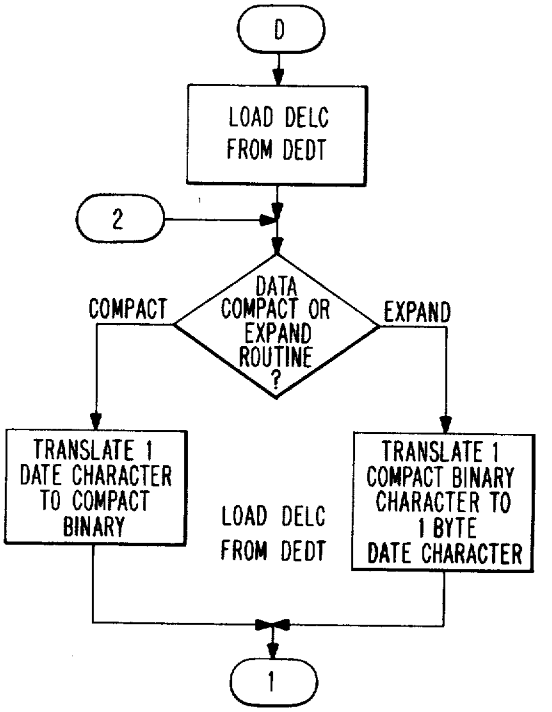
FIG. 3F
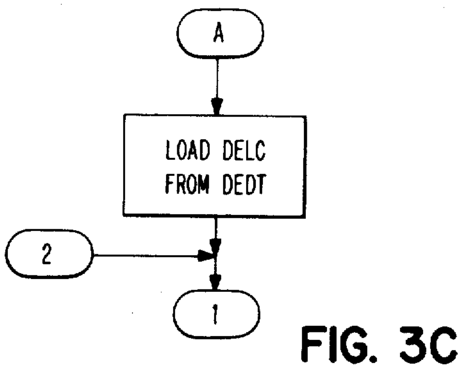
FIG. 3C
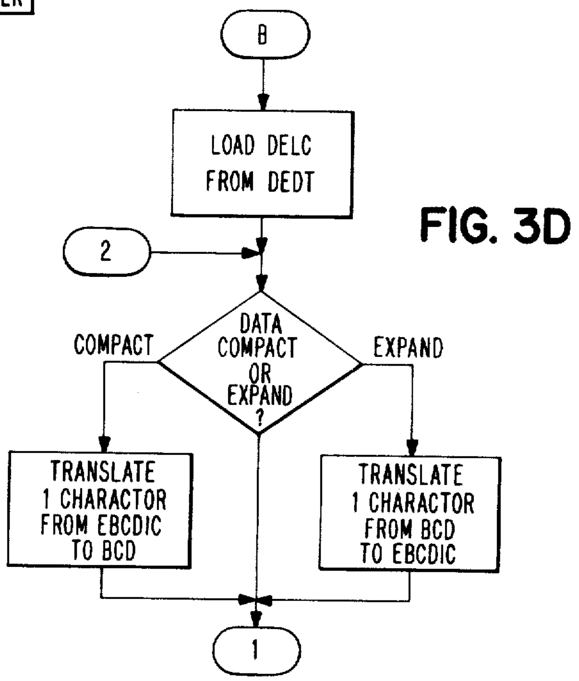
FIG. 3D

METHOD AND APPARATUS FOR DATA FORM MODIFICATION

BACKGROUND OF THE INVENTION

FIELD OF THE INVENTION

The present invention relates to data handling, and more particularly to data form modification of information to be stored in a large-scale information processing system.

It is a basic requirement of large scale information storage and retrieval systems to store millions or perhaps billions of bytes of information with a direct access capability. Where such a volume of data is stored in unmodified form on direct access storage devices having reasonable performance characteristics, the number of such storage devices required becomes large and the cost of the total system becomes very high.

Therefore, in the prior art, systems have been developed to compact data according to a single data compaction technique such as conversion from an expanded binary coded decimal form to a compact binary coded decimal form which might require a smaller number of binary bits for each character to be stored.

Although implementations of single compaction techniques for storage requirements reduction have increased storage usage efficiency, the use of the single data compaction technique does not take into consideration the various kinds of data which might be handled in an information storage and retrieval system and therefore is not as efficient as a data compaction technique which did perform a different compaction routine for different kinds of data to be handled.

SUMMARY OF THE INVENTION

Therefore, it is an object of the present invention to efficiently modify the form of data to be stored in large scale storage systems.

It is another object of the present invention to efficiently modify the form of data to be stored in a large scale storage system to improve the utilization of such storage devices and to increase the effective data storage capacity.

It is still another object of the present invention to efficiently modify the form of data to be stored in a large scale storage system to improve the utilization of such storage system and to increase the effective data storage capacity by executing a different data form modification routine for each of several different kinds of data.

A further object of the present invention is to efficiently modify data stored in a large scale storage system to regain a usable form.

Accordingly, the present invention includes apparatus and method for automatically modifying the form of data fields to be stored in a large scale storage system to either compact data for efficient use of storage or to expand data stored in compacted form in storage for the user.

Since a record of information may contain several different kinds of data, for example, alphanumeric data, such as a name; numeric data such as an identification number; special format numeric data such as date information; and numeric data in the form of salary information; the greatest efficiency in the use of storage devices can be obtained if each kind of data is modified in form, for example compacted, by a data form modification routine which will achieve the highest density of information for that kind of data.

Therefore, a system embodying the present invention includes means for storing a group of different routines where each routine is to be executed on a different kind of data, means for storing a data element definition table wherein each entry will include a routine number identifier and a data length identifier for the data element to be modified, means for storing data in a first form, means for storing data in a second form, including means for addressing each of the storing means, means for translating data from a first form to a second form or conversely translating data from a second form to a first form, and means for controlling the execution of each of the group of data modification routines in correct sequence for each data record to be modified and stored.

A system constructed according to the present invention has the capability of performing a complete data modification of a group of different kinds of data in a record using a different data modification routine for each data element in a record to achieve maximum storage utilization efficiency.

The foregoing and other objects, features and advantages of the invention will be apparent from the following more particular description of a preferred embodiment of the invention as illustrated in the accompanying drawing.

BRIEF DESCRIPTION OF THE DRAWING

FIG. 2A shows a storage table entry for a data element definition.

FIG. 2B shows the tabulation of a group of data element definitions to form the data element definition table (DEDT).

FIGS. 3A through 3J show a flow chart describing the operation and method according to the present invention where:

FIG. 3A describes the initialization of the operation of apparatus for executing the method of the present invention;

FIG. 3B describes the decoding of a routine to be executed;

FIG. 3C is a flow chart for routine number 1, MOVE DATA:

FIG. 3D is a flow chart for routine number 2, a data form modification between EBCDIC and BCD including trailing blanks;

FIG. 3E is a flow chart for routine number 3 which translates data form between EBCDIC and BCD in which trailing blanks are eliminated during compaction and added during expansion;

FIG. 3F is a flow chart for routine number 4 which compacts or expands between one byte per character data information and binary data information;

FIG. 3G is a flow chart for routine number 5 which compacts or expands between unsigned packed decimal and decimal;

FIG. 3H is a flow chart for routine number 6 which translates between unsigned numeric EBCDIC and binary numeric;

FIG. 3I is a flow chart for the common portion of the operation and method after the specific translation for the routine selected has been executed;

FIG. 3J is a flow chart for handling trailing blanks in a routine requiring deletion or addition of trailing blanks.

DETAILED DESCRIPTION OF THE INVENTION

The following glossary of terms will facilitate the understanding of the invention.

BCD
Binary Coded Decimal.

Compacted Bit Counter (125)
an 8-bit counter that is used in conjunction with the Compacted Byte Counter, and is used to identify the length of a byte.

Compacted Byte Counter (126)
a counter that is used to count the number of bytes in a Compacted Record.

Compacted Record
the Data Record as it appears in the system after the significant portions of the data have been translatively encoded to a more compact representation.

Compacted Record Area (CRA 104D)
the area in read/write storage where the Compacted Record is located.

Compacted Record Area Address Register (115)
a register that contains the address of the Compacted Record Area in read/write storage.

Data Element
a collection of uniquely identifiable information (such as name, date, salary, etc.).

Data Element Definition
a collection of information that describes a Data Element (i.e., transformation routine number and data element length).

Data Element Definition Table (DEDT 104A)
the collection of Data Element Definitions that is associated with a Data Record.

Data Element Length
specifies the length in bytes of a particular Data Element.

Data Element Length Counter (DELC 122)
a system counter that is used to count the number of bytes in a specified Data Element.

Data Record
a collection of Data Elements.

EBCDIC
Extended Binary Coded Decimal Interchange Code.

Expanded Record
the Data Record as it appears to the user.

Expanded Record Area (XRA 104C)
the area in read/write storage where the Expanded Record is located.

Expanded Record Area Address Register (116)
a register that contains the address of the Expanded Record Area in read/write storage.

Trailing Blanks Address Register (TBAR 120)
a register that contains the address in read/write storage where the number of trailing blanks is to be stored.

Trailing Blanks Counter (TBC 118)
a counter that is used to count the number of trailing blanks in a Data Element. It is generally associated with Data Elements that contain aliphabetic information.

Figure 1A:
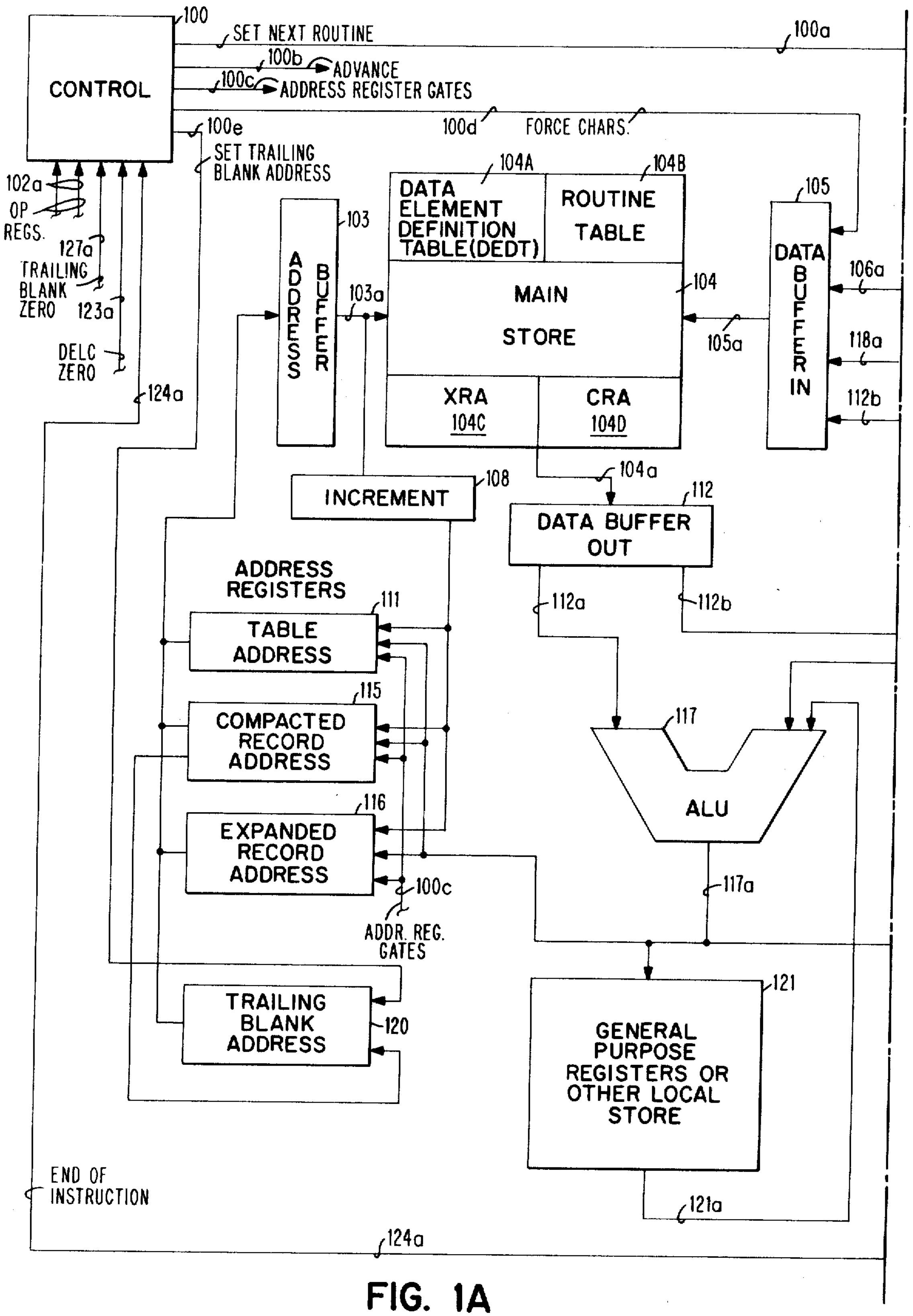
FIGS. 1A and 1B show a block diagram of preferred apparatus embodying the present invention.
Figure 1B:
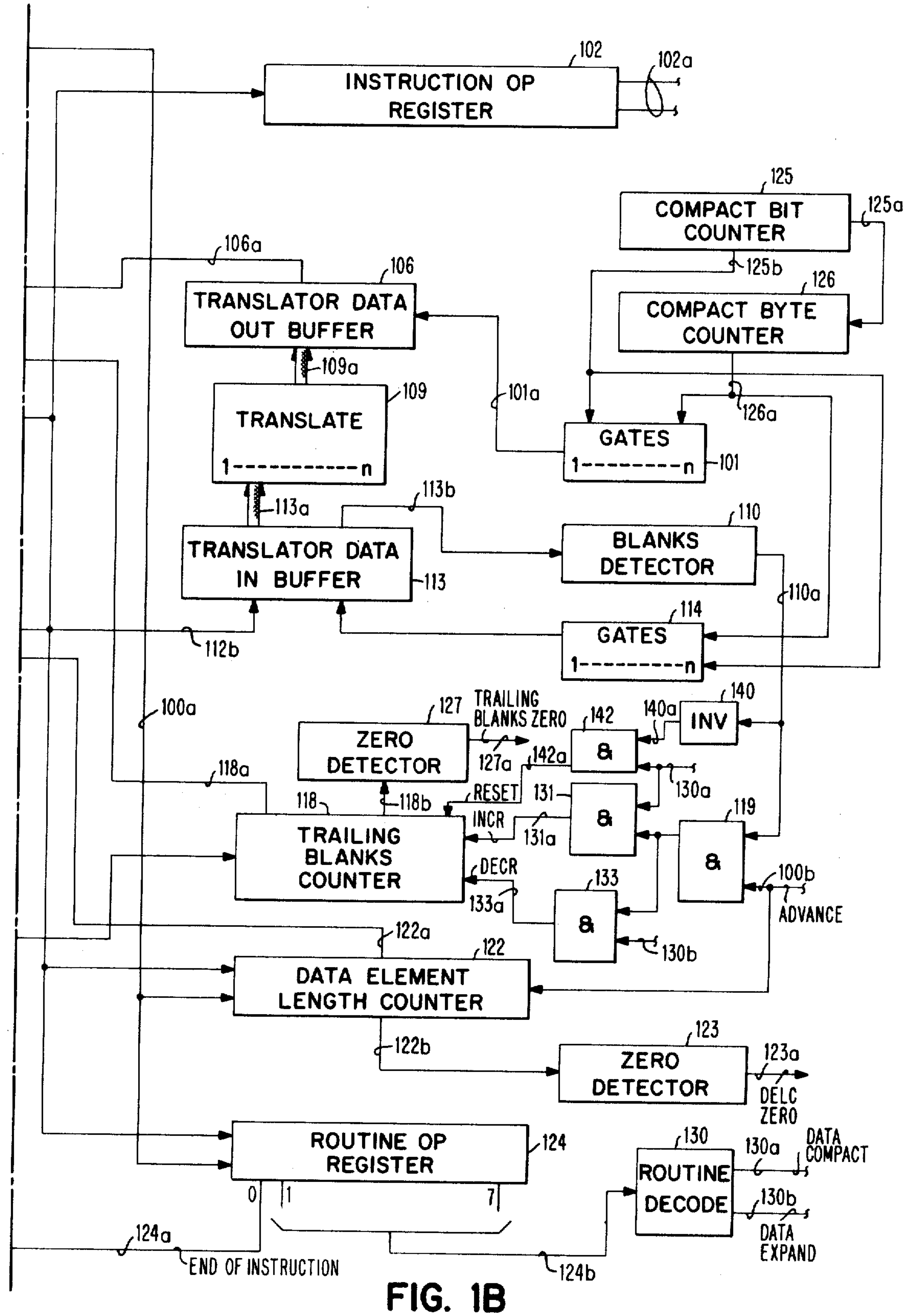
Figure 3A:
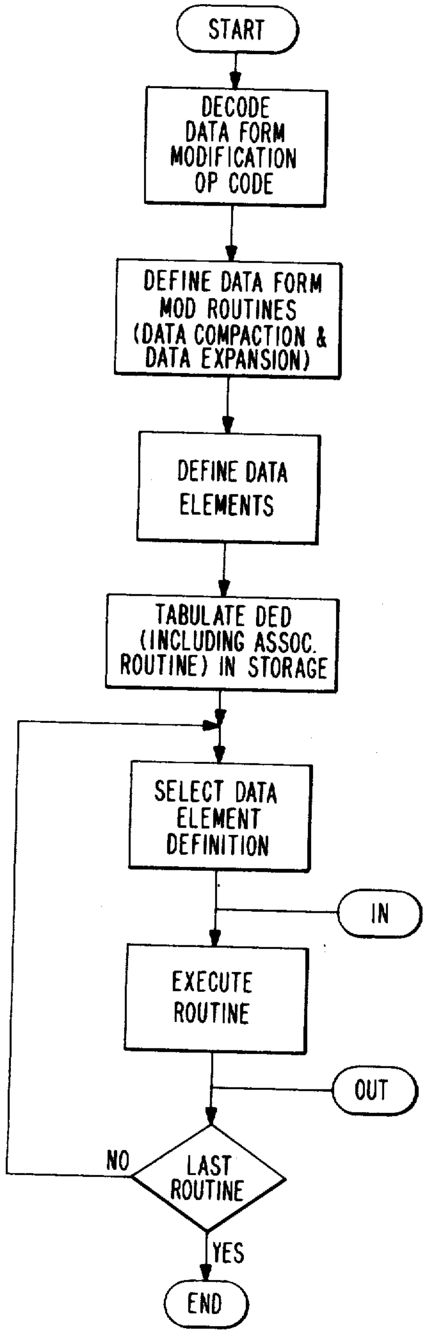

Referring now to FIGS. 1A, 1B and 3A, an instruction is fetched from main store 104 to instruction operation code register 102 through Data Buffer Out 112 by way of lines **104*a*, 112*b***.

The processor shown in FIGS. 1A and 1B may employ an IBM SYSTEM/360 RS instruction format which is well-known in the art and is fully described in U. S. Pat. No. 3,400,371 assigned to the assignee of the present application. The RS format contains an 8-bit operation code, an R1 address for the expanded record area (XRA); an R2 address for the first entry in a Data Element Definition Table (DEDT) 104A; and a B2, D2 address of the Compacted Record Area (CRA) 104D.

For the purposes of illustration, the following data record format will be used:

Bytes 0 through 24- NAME, 25 bytes, John — Jones ——;

Bytes 25 through 36- LOCATION, 12 bytes, Ritchford;

Bytes 37 through 42- IDENTIFICATION NUMBER, 6 bytes, 379820;

Bytes 43 through 48- DATE, 6 bytes, 102139;

Bytes 49 through 55- SALARY, 7 bytes, 00358.26.

The data element definition table (DEDT) associated with this record is shown in FIG. 2B.

The data form modification routines to be performed are identified as folows:

| ROUTINE NUMBER | DESCRIPTION |
|---|---|
| 1. | Move data element. |
| 2. | Translate between EBCDIC and BCD. |
| 3. | Translate between EBCDIC and BCD eliminating trailing blanks during compaction and adding trailing blanks during expansion. |
| 4. | Translate date. |
| 5. | Translate between unsigned decimal and half-byte packed decimal. |
| 6. | Translate between unsigned numeric EBCDIC and binary. |

The information listed above is stored in Routine Table 104B for access during execution of a data form modification instruction.

As seen in FIG. 2B, Routine Number 5 is not used for the example data record.

Referring now to FIG. 3A, the initialization of a data form modification will be described.

Two instruction operation codes are recognized for data form modification. They are COMPACT DATA and EXPAND DATA and both appear in RS format as described above.

When either of the data form modification operation codes have been decoded, each of the data form modification routines are defined and established in storage in routine table 104B, each data element for each data record to be modified is defined and the definition stored in data element definition table 104A. The starting address of the record to be modified in storage is then loaded into the appropriate address register. For a data compaction operation the address would be loaded into the expand record address register 116 and for a data expansion operation the starting address would be loaded into the compact record address register 115. The trailing blank address register 120, data element length counter 122 compact bit counter 125, compacted byte counter 126 and trailing blank counter 118 are set to all zeros.

An access is made to DEDT 104A and an entry is selected which contains the routine number to be executed and the length of the data element to be operated on as shown in FIG. 2A. For the specific data example discussed above, routine 3 would be decoded as shown in FIG. 2B indicating that a data form modification would be made in which NAME information would be compacted from 8 bit EBCDIC characters to 6 bit BCD characters with trailing blanks eliminated(See FIG. 3E). The contents of CRA address register 115 are transferred to the TBAR 120 and the contents of storage location specified by the CRA address register 115 are set to zero. The CRA address register is incremented by one.

A decision is then reached as to whether data is to be expanded in form or compacted in form. For the purpose of the example set out above, the data in this and each of the following routines to be described is to be compacted.

In each of the flow charts, FIGS. 3C, 3D, 3E, 3F, 3G, 3H, 3I and 3J, when the decision block "DATA COMPACT OR EXPAND ROUTINE?" is reached the COMPACT path will be followed.

The first byte in XRA 104C which is also the first character J of the first word of the NAME element, is translated by translator 109 which may be implemented as a read only storage device or a table lookup device in which the byte to be translated acts to address an entry in the translator which is then read out as the translated data on lines 109a to translator data out buffer 106 as the BCD representation.

Figure 3B:
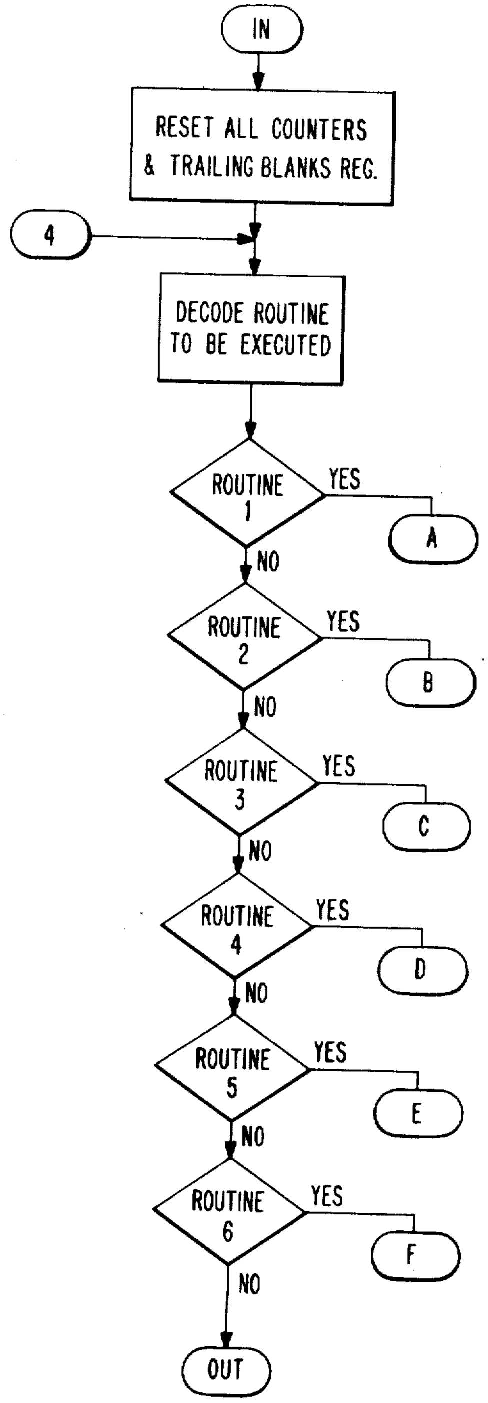
Figure 3E:
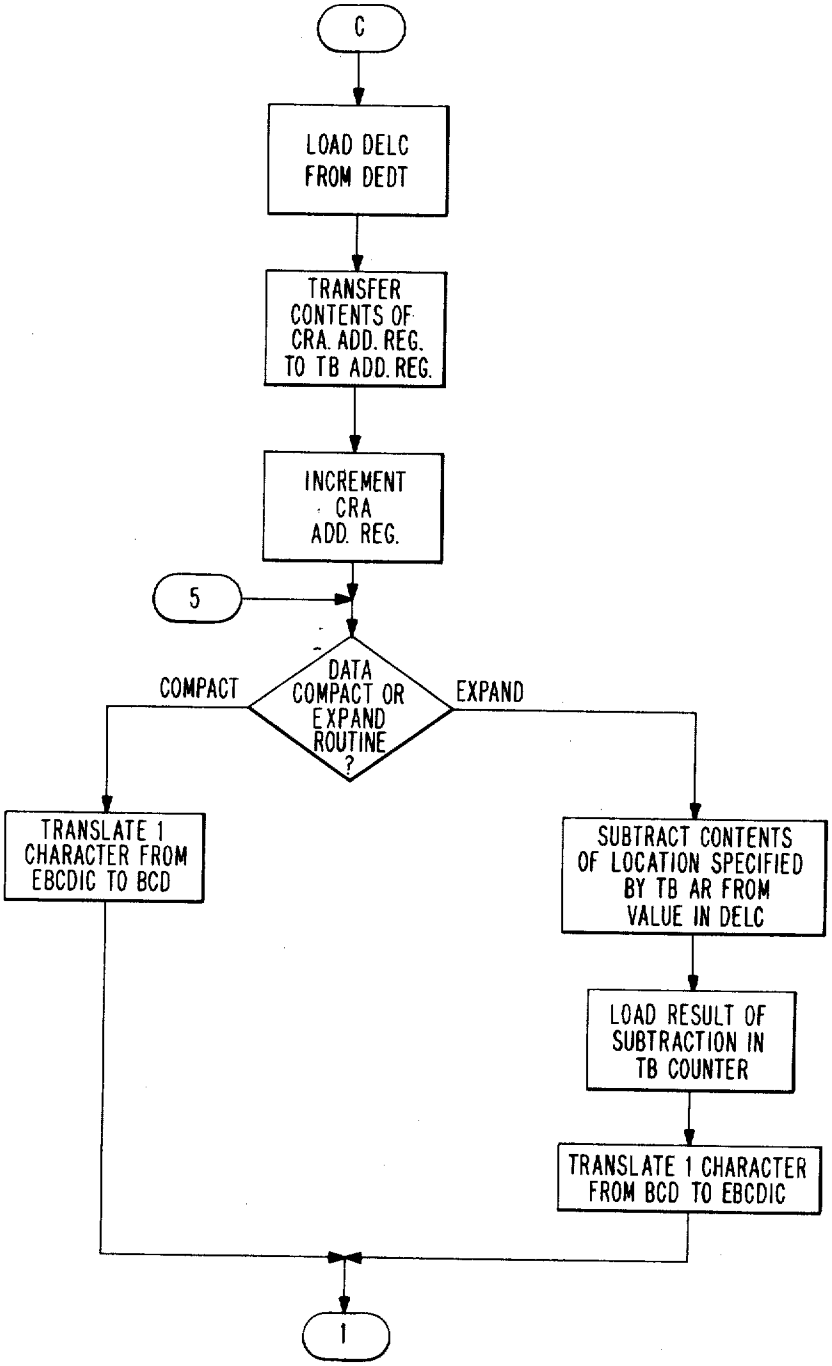
Figure 3G:
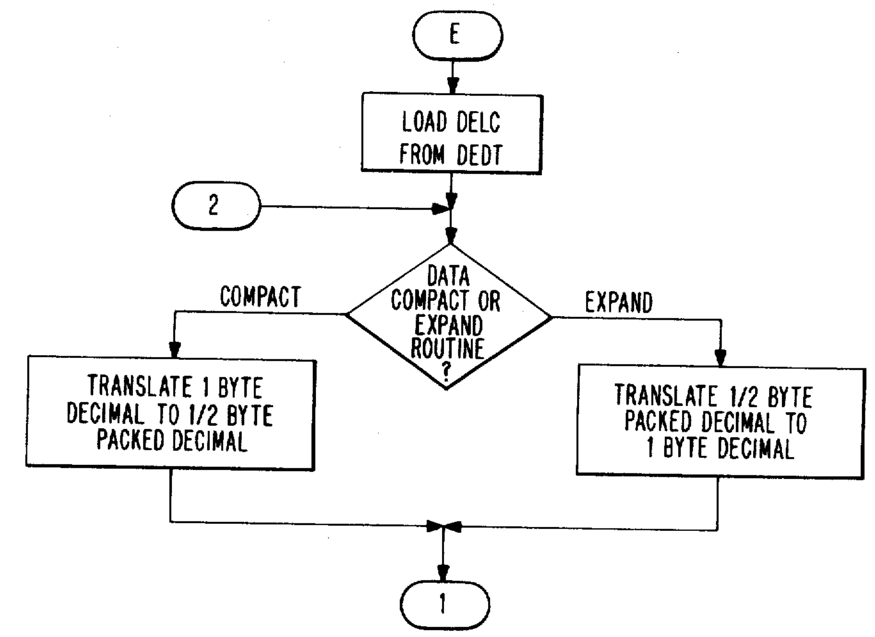
Figure 3H:
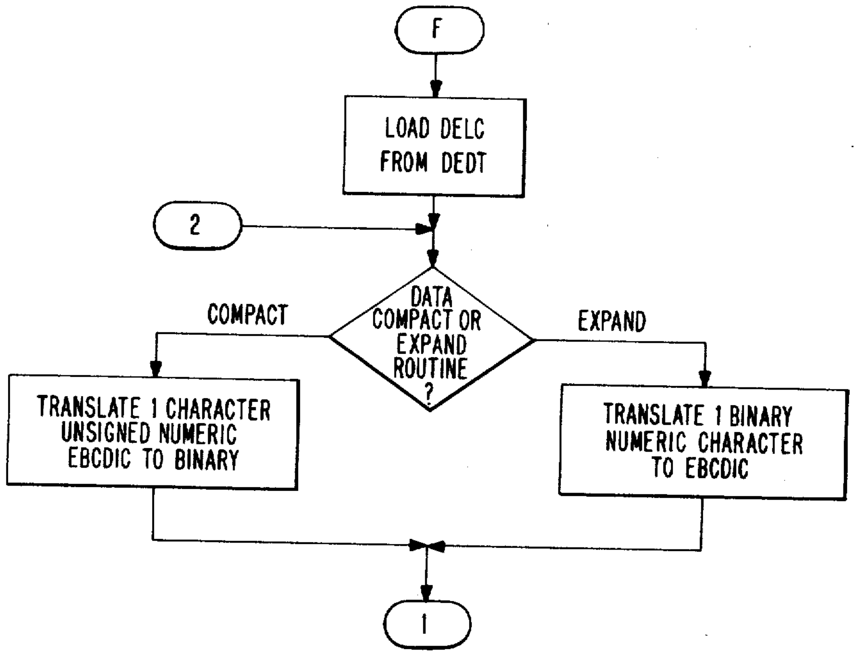
Figure 3I:
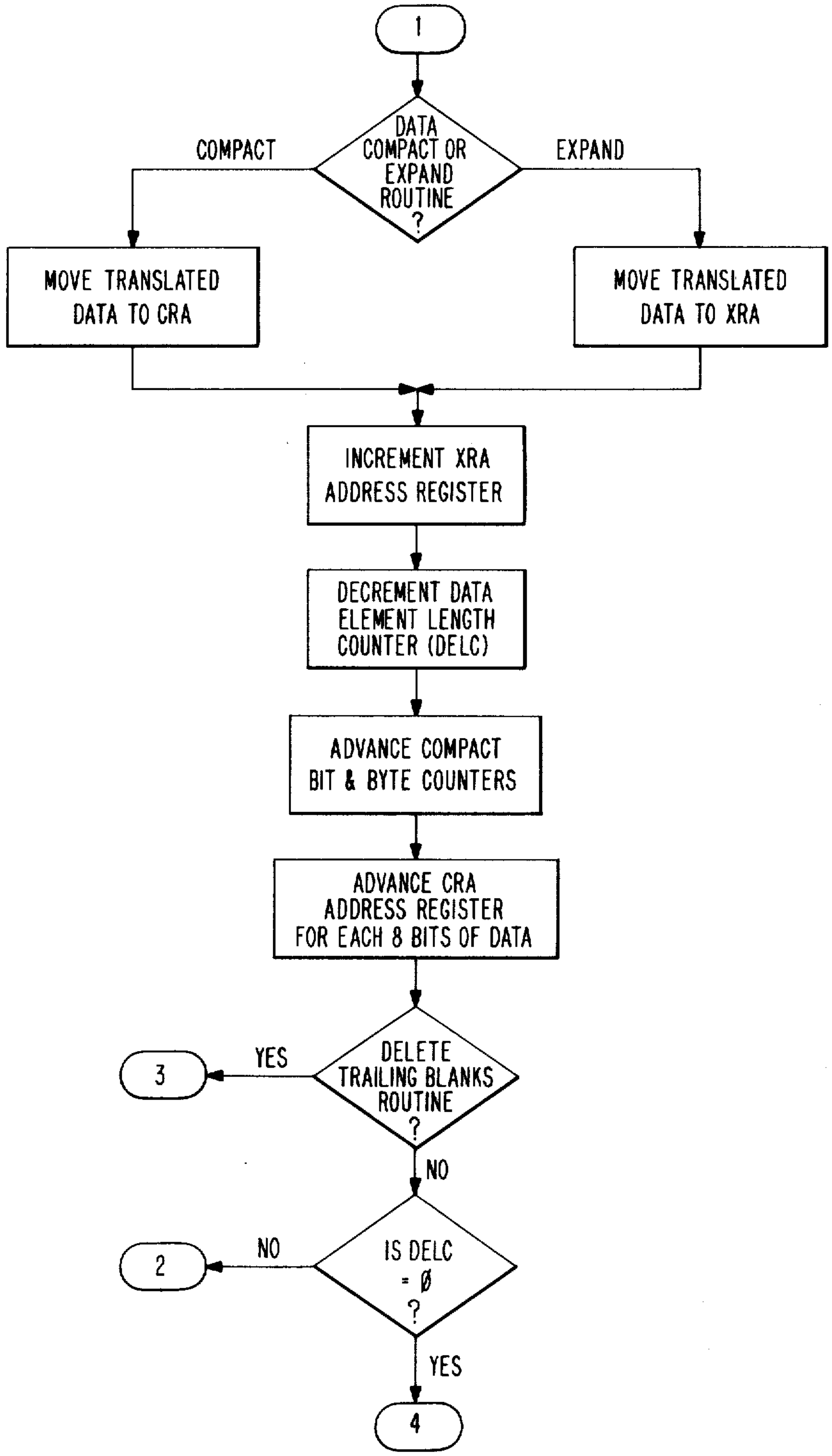
Figure 3J:
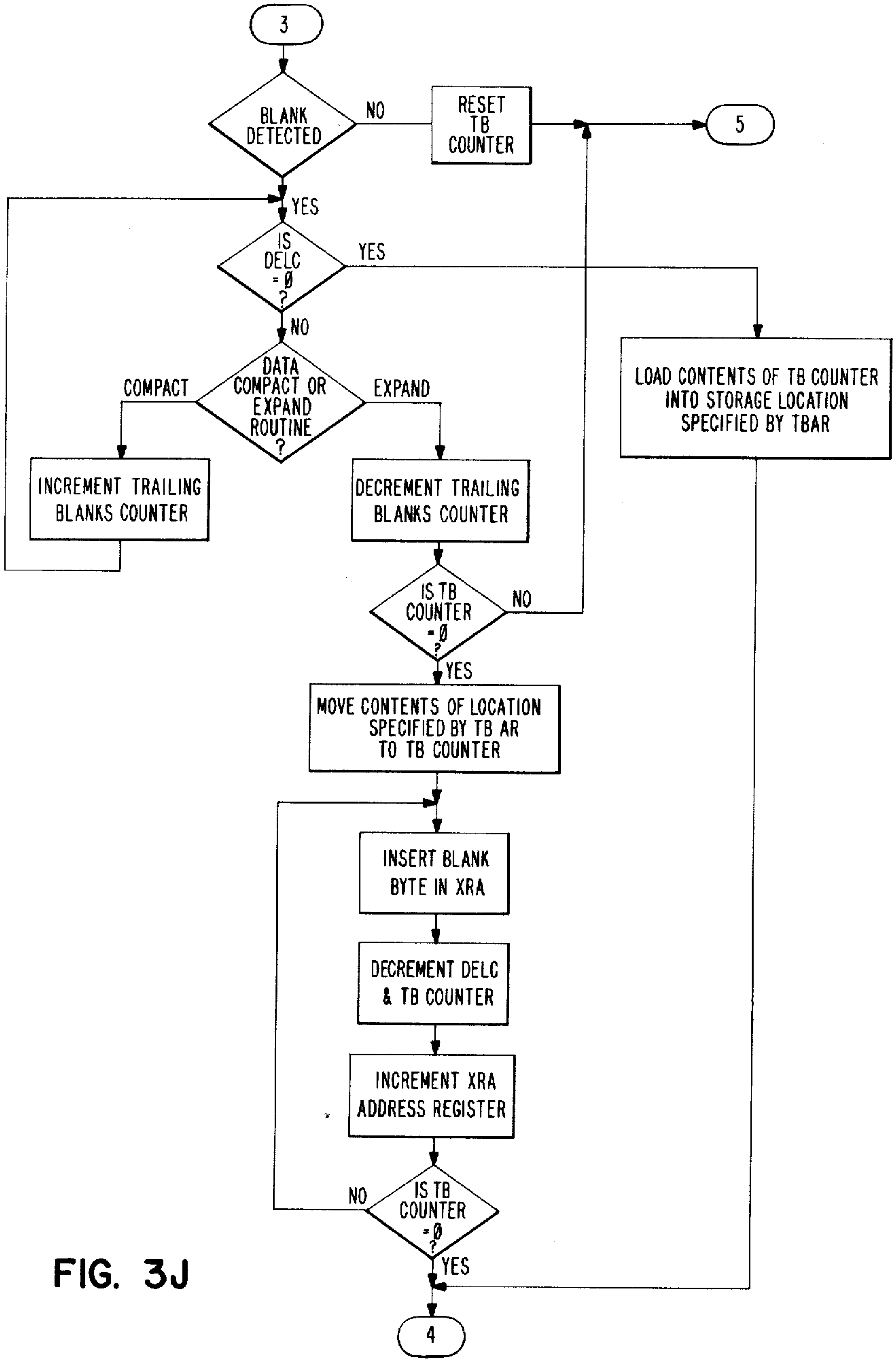

Referring now to FIGS. 3I and 3J, the compacted data is transferred from translator data out buffer 106 to CRA 104D by lines 106a, storage data buffer in 105 and lines 105a. The XRA address register 116 is incremented and the DELC 122 is decremented. The compact bit counter 125 has advanced six positions during the data translation. For each 8 bits of compact data indicated by compact bit counter 125 which steps compact byte counter 126 by 1, CRA address register 115 is incremented.

Since routine 3 does operate to delete trailing blanks, a branch is taken in the operation and blanks detector 110 examines the character translated to determine if a blank has been detected. For the first character of the NAME data a blank should not be detected. Trailing Blanks Counter 118 is reset by line 142a, the output of gate 142 which represents no Trailing Blank detected. Therefore, the second byte of the NAME element is accessed from XRA 104C and the process continues as described above.

When a blank is detected by blank detector 110, DELC zero detector 123 is examined by control 100 to determine whether the data element length including trailing blanks has been exhausted. At the detection of the first blank, DELC 122 is not zero in the example shown in FIG. 2B and discussed above. The first blank detected is not a trailing blank, but a space between words in the NAME element.

Therefore, Control 100 will activate line 100d to force two blanks between the words of the NAME elements. These blanks are part of the data element and not trailing blanks, so they are not eliminated from the Compacted data.

When the first Character of the second word of the NAME element appears in Translator Data In Buffer 113, Blanks Detector 110 is deactivated, causing gate 142 to be enabled through Inverter 140. Trailing Blanks Counter 118 is reset and the processing of the second word of the NAME element continues.

Control 100 which performs supervisory functions for the apparatus shown in FIGS. 1A and 1B, may be a microprogram control element such as is well known in the art and generally described in U. S. Pat. No. 3,400,371. Inputs to Control 100, such as INSTRUCTION OPERATION REGISTER lines 102a, TRAILING BLANKS ZERO 127a, DELC zero 123a, and END OF INSTRUCTION 124a are operated on by the microprogram control elements in control 100 to produce the necessary output control lines such as SET NEXT ROUTINE 100a, ADVANCE 100b, ADDRESS REGISTER GATES 100c, FORCE CHARACTERS 100d and SET TRAILING BLANK ADDRESS 100e.

When the first Trailing Blank is detected in a Trailing Blanks routine after the last data word of the NAME has been processed and DELC is not equal to zero, the Trailing Blanks counter 118 is incremented through gate 119 driven by advance line 100b and gate 131 which is enabled by routine decode 130 output 130a (Compact Data routine).

If the routine were a Expand Data routine, Routine Decode 130 would produce an output on line 130b which would then enable gate 133 to produce a DECREMENT TRAILING BLANKS COUNTER signal on line 133a. Trailing Blanks Counter 118 is incremented and DELC 122 is decremented at the same rate by advance signal 100b until DELC 122 equals zero. At this time, line 122b activates Zero Detector 123 which generates DELC zero signal 123a. This causes the contents of Trailing Blanks Counter 118 to be inserted in storage location specified by the contents of TBAR 120 via line 118a to Data Buffer IN 105.

Since the DEDT entry for routine 3 has been exhausted, an access is made to DEDT 104A and the next entry is selected. The routine number is decoded and referring to FIG. 2B it is seen that routine number 2 which translates between 8 bit EBCDIC characters and 6 bit BCD characters including all trailing blanks is to be executed. Referring to FIG. 3B, when routine 2 is decoded, a branch is made to the operation described in flow chart FIG. 3D. DELC 122 is set equal to 12 which represents a 9 character LOCATION element plus 3 trailing blank characters which are included in the compacted data.

Since 25 bytes of the XRA 104C have been accessed during the execution of routine number 3, the 26th byte is now accessed.

The 26th byte in XRA 104C corresponds to the first character,R, of the LOCATION element.

Referring now to FIG. 3D, when routine number 2 is decoded, DELC 122 is loaded with the length information from DEDT 104A. In this example, DELC 122 is set equal to 12.

One character of EBCDIC information is then fetched from XRA 104C through data buffer out 112 and translator data buffer in 113 to translator 109 where the LOCATION data element is translated to BCD code in the same manner as was the NAME information compacted by routine number 3.

The translated data is then moved to CRA as described above and the registers and counters are incremented or decremented as shown in FIG. 3I and as described in relation to routine 3.

Since routine 2 does not delete trailing blanks, a loop is made between the "DELC equal zero" block of FIG. 3I and the translate block of FIG. 3D until all characters including trailing blanks in XRA relating to LOCATION element have been compacted.

When DELC 122 is zero, Zero Detector 123 produces a swgnal to control 100 and the next routine is decoded.

After the routine number 2 has been executed, the LOCATION element in XRA 104C occupies 96 bits of storage which represents 12 bytes while the compacted LOCATION element in CRA 104D requires 72 bits of storage (9 bytes) for the same data.

Referring now to FIG. 2B, the third entry in DEDT 104A indicates that routine 6 (compact unsigned numeric EBCDIC to binary) is to be executed.

The value 6 is loaded into DELC 122. Execution of routine 6 causes the 6 byte IDENTIFICATION NUMBER data element which is stored in byte positions 37 to 42 of XRA 104C to be translated to a 19 bit binary number.

Referring to FIG. 3H, one character of unsigned numeric EBCDIC is converted to binary by translator 109 and then moved to CRA 104D as described for the previous routine.

At the completion of routine 6, XRA address register 116 has advanced six positions, CRA address register has advanced two positions, compact byte counter 126 has advanced two positions and compact bit counter 125 contains the value 1.

The IDENTIFICATION NUMBER data element requires 48 bits (6 bytes) in XRA 104C and 19 bits (two bytes plus one bit) in CRA 104D.

As before, the detection of a zero by Zero Detector 123 indicates that DELC 122 is exhausted and the next entry in DEDT is selected.

As shown in FIG. 2B, the 4th entry in DEDT 104A indicates that routine number 4 (translate DATE) is to be executed, and that the value of 6 is inserted in DELC 122.

FIG. 3F shows that 1 DATE character is to be translated to binary form for each step of DELC 122. The routine is continued until DELC equals zero at which point the DATE element in XRA 104C occupies 48 bits (6 bytes) and the DATE element in CRA 104D occupies 16 bits (2 bytes).

The DELC zero line **123*a* indicates that routine 4 has been completed and causes Control 100 to activate SET NEXT ROUTINE line 100*a*.**

Referring again to FIG. 2B, the next entry in DEDT 104A indicates that routine 1 (Move data from XRA 104C to CRA 104D) is to be executed.

Since the data element definition to be operated on is the last data element in a record, bit zero (the high order bit) of the routine operation code will be set to a logic 1. Routine operation code register 124 has output **124*a* which signals END OF INSTRUCTION when bit zero of the routine operation code is equal to a logic 1. This signal indicates that when this last routine has been executed, the compact record instruction has been completed and as shown in FIG. 3A**, the operation is at an end.

Bits 1 through 7 contained in Routine Operation Code Register 124 are transmitted to routine decode 130 on lines **124*b*** where the specific routine to be executed is determined.

More specifically, with routine 1 to be executed, for the data element definition extracted from the DEDT 104A, as shown in FIG. 2B, the value 7 is loaded into DELC 122.

Referring also to FIG. 3C, and to FIG. 3I, the only operation that is performed for routine 1 is a move of data from the XRA 104C to CRA 104D one byte at a time with no modification being performed on the data form. When DELC 122 equals zero, Zero Detector 123 then signals control 100 and the presence of END OF INSTRUCTION line **124*a*** signals the end of the Compact Record instruction.

Since the entire data record has been compacted, it is now possible to record the compacted record in storage (not shown) for later use in an information storage and retrieval system.

When the record has been completely compacted, a data record which had required 56 bytes of storage in expanded form now requires only 30 bytes of storage in compacted form. This represents a reduction in storage requirements of approximately 47 percent.

Although the invention has been described with respect to an example of translating data from an expanded form to a compacted form, the apparatus shown in FIGS. 1A and 1B may also execute EXPAND RECORD instructions in RS format according to the method generally described in FIGS. 3A through 3J following the EXPAND path at each decision block labelled ("DATA COMPACT OR EXPAND ROUTINE?")

In each routine of an EXPAND RECORD instruction, the major difference from a COMPACT RECORD instruction is the direction of translation of the data form. Since the translator 109 has the capability of translating in either direction depending upon which read only storage elements are addressed, the operation of the expand routines are analogous to the compact routines described above.

The one routine which may have a significant difference between the operation of Compact Record and Expand Record instruction is routine 3 in which trailing blanks are eliminated during compaction or added during expansion. FIG. 3J shows the steps followed in the execution of routine 3 during an expand record instruction to reinsert trailing blanks in XRA 104C.

While the invention has been particularly shown and described with reference to a preferred embodiments thereof, it will be understood by those skilled in the art that various changes in form and detail may be made therein.

What is claimed is:

1. Apparatus for executing a plurality of data form modification routines on a plurality of data record groups to achieve efficient utilization of storage, comprising:

storage means including a first portion for storing a group of data form modification routines wherein each routine is executed on one of said plurality of data groups;

a second portion for storing a data element definition table wherein each entry in said table defines a data element to be modified;

a third portion for storing data in a first form; and a fourth portion for storing data in a second form;

means for accessing each of said portions of said storage means independently;

means coupled to said storage means for translating data between said first form and said second form; and control means coupled to said storage means, said means for translating, and said means for accessing, for controlling the translation of data between said first form and said second form.

2. Apparatus according to claim 1 wherein each said entry in said table comprises a routine identifier and a data length indicator, further comprising means connected to said storage means for decoding said routine number identifier for executing one of said plurality of data form modification routines.

3. Apparatus according to claim 2 further comprising:

means connected to said means for translating for modifying trailing blanks in a data modification routine requiring modification of trailing blanks.

* * * * *